(12) United States Patent
Asai et al.

(10) Patent No.: US 9,190,914 B2
(45) Date of Patent: Nov. 17, 2015

(54) SWITCHING POWER SUPPLY APPARATUS

(71) Applicant: Murata Manufacturing Co., Ltd., Nagaokakyo-shi, Kyoto-fu (JP)

(72) Inventors: Hirotsugu Asai, Nagaokakyo (JP); Hironori Matsumoto, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 400 days.

(21) Appl. No.: 13/928,655

(22) Filed: Jun. 27, 2013

(65) Prior Publication Data

US 2014/0008981 A1 Jan. 9, 2014

(30) Foreign Application Priority Data

Jul. 9, 2012 (JP) ................................ 2012-153369

(51) Int. Cl.
*H02M 3/335* (2006.01)
*G05F 3/06* (2006.01)

(52) U.S. Cl.
CPC ...... *H02M 3/33507* (2013.01); *H02M 3/33561* (2013.01); *Y10T 307/406* (2015.04)

(58) Field of Classification Search
None
See application file for complete search history.

(56) References Cited

U.S. PATENT DOCUMENTS 6,178,100 B1 * 1/2001 Kitano ................ H02M 3/3385
363/19

* cited by examiner

*Primary Examiner* — Jared Fureman
*Assistant Examiner* — Aqeel Bukhari
(74) *Attorney, Agent, or Firm* — Keating & Bennett, LLP

(57) ABSTRACT

In a switching power supply apparatus, a main switching control circuit performs switching control of a low-side switch device and a high-side switch device based on a feedback signal corresponding to a main output voltage output from a secondary winding of a transformer, and applies and stops applying a voltage to a primary winding of the transformer. A digital signal processor, in accordance with the load status of the main load, changes set target values, performs switching control of switch devices of the sub-rectifying and smoothing circuits, and drives sub-loads.

20 Claims, 4 Drawing Sheets

FIG. 3
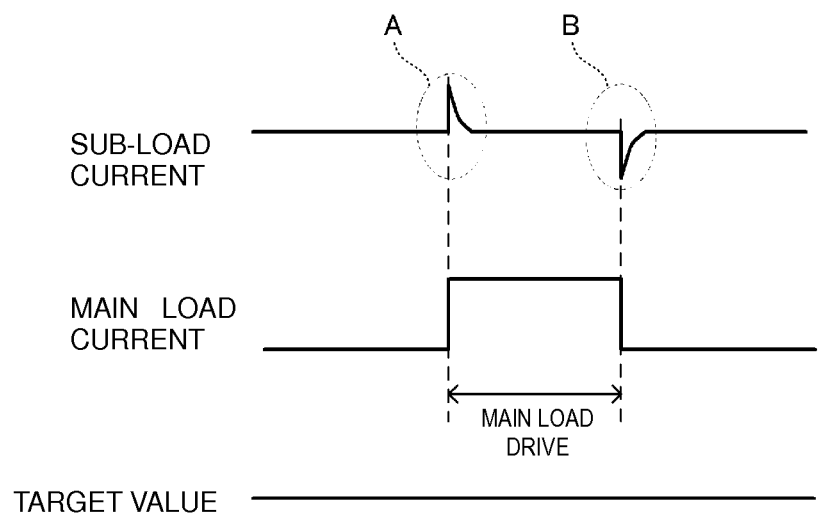
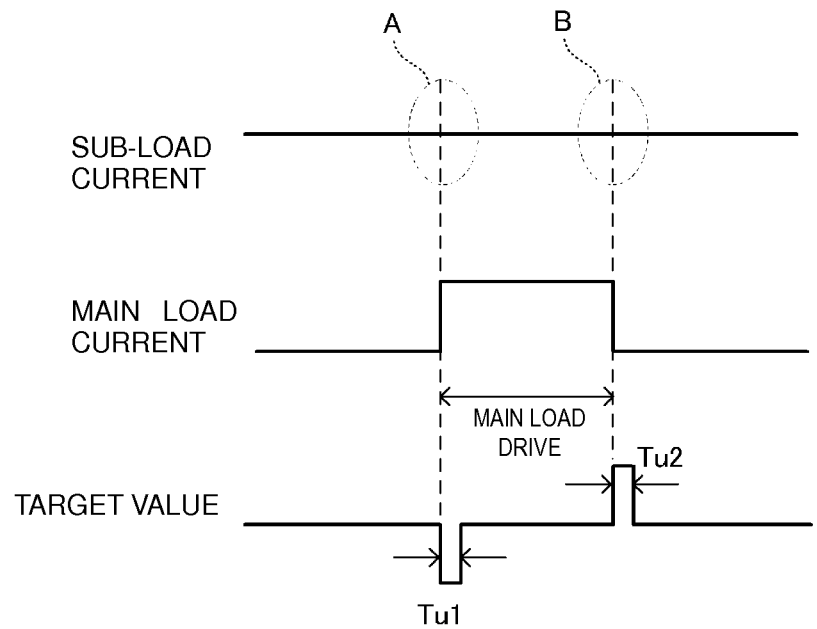

SWITCHING POWER SUPPLY APPARATUS

BACKGROUND OF THE INVENTION

1. Field of the Invention

The present invention relates to switching power supply apparatuses each supplying power to a plurality of loads.

2. Description of the Related Art

A switching power supply apparatus which supplies power to a plurality of diode loads needs to have a configuration in which DC voltages are output from a plurality of output units. The switching power supply apparatus disclosed in Japanese Unexamined Patent Application Publication No. 10-28376 employs a configuration in which a plurality of DC voltages are obtained by providing a plurality of secondary windings and performing rectification and smoothing.

In the switching power supply apparatus disclosed in Japanese Unexamined Patent Application Publication No. 10-28376, a switch device and a capacitor are connected to one of two secondary windings and a first DC voltage is output to a first load. A diode and a capacitor are connected to the other of the two secondary windings and a second DC voltage is output to a second load. The first DC voltage which varies in accordance with the power consumption of the first load is detected, and based on the detection result, switching control of the switch device on the primary side of the transformer is performed. As a result, stabilization of the first DC voltage is realized even when the power consumption of a load significantly changes.

In the switching power supply apparatus disclosed in Japanese Unexamined Patent Application Publication No. 10-28376, the switching control of a switch device on the primary side of the transformer is targeted at the first DC voltage. Hence, even when the second load is constant, the second DC voltage varies due to the switching control of the switch device on the primary side of the transformer in accordance with variations in the first load. Further, for example, a surge current may be generated and flow through the second load due to a sudden change in the first load. This surge current may cause noise to be generated on the load side, whereby the characteristics on the load side may be affected or a current exceeding the rated current may flow through the second load.

SUMMARY OF THE INVENTION

Accordingly, preferred embodiments of the present invention provide a switching power supply apparatus which supplies a stable current and a stable voltage to a plurality of loads and which prevents generation of a surge and has stable operation.

A switching power supply apparatus according to a preferred embodiment of the present invention includes a transformer including an input unit, a main output unit, and a sub-output unit; a switch circuit that switches between application of and stopping application of a voltage to the input unit; a main rectifying and smoothing circuit that rectifies and smoothes an induced voltage received from the main output unit and outputs a main output voltage; a converter unit that steps up or steps down the main output voltage and outputs the stepped up or stepped down voltage to a main load in a subsequent stage; a sub-rectifying and smoothing circuit that is provided in the sub-output unit and, through switching of a switch device, rectifies and smoothes an induced voltage received from the sub-output unit and outputs the rectified and smoothed voltage to a sub-load connected to the sub-rectifying and smoothing circuit; a first control unit that performs switching control of the switch circuit based on a feedback signal corresponding to the main output voltage; a second control unit that, based on a set target value, performs switching control of the switch device of the sub-rectifying and smoothing circuit and drives the sub-load; a detection unit that detects information regarding a load status of the main load; and a changing unit that changes the target value based on the information detected by the detection unit.

With this configuration, switching control of the switch circuit is performed based on a feedback signal corresponding to the main output voltage, and the main output voltage transiently changes in accordance with the load status of the main load. As a result, a voltage input to the sub-rectifying and smoothing circuit also changes transiently, such that a voltage and a current supplied to the sub-load change. Hence, by changing a target value set for the sub-rectifying and smoothing circuit in accordance with the load status of the main load, the voltage and current supplied to the sub-load are stabilized. In particular, even when the load status of the main load suddenly changes, a surge voltage or a surge current supplied to the sub-load is decreased, such that stable operation is realized.

It is preferable that the converter unit performs intermittent driving of the main load, and the changing unit changes the target value at a time when a current of the intermittent driving rises.

With this configuration, voltage and current surges supplied to the sub-load are prevented.

The changing unit may change the target value at a time when the current of the intermittent driving falls.

With this configuration, voltage and current surges in the negative direction (sudden decreases) that are generated when the current of the main load falls and that are supplied to the sub-load can be prevented.

It is preferable that the changing unit increases an amount of change of the target value in accordance with an increase in an amount of change of a current of the main load.

With this configuration, by increasing the target value in accordance with an increase in the power consumption of the main load, variations in a voltage and a current supplied to the sub-load can be prevented.

According to various preferred embodiments of the present invention, by changing a target value set for the sub-rectifying and smoothing circuit in accordance with the load status of the main load, the voltage and current supplied to the sub-load are stabilized. In particular, even when the load status of the main load suddenly changes, a surge voltage or a surge current supplied to the sub-load is decreased, such that stable operation is realized.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 3 is a diagram illustrating the current waveforms of a main load current and a sub-load current.

DETAILED DESCRIPTION OF THE PREFERRED EMBODIMENTS

Switching power supply apparatuses according to preferred embodiments of the present invention will be described below for the example case in which the switching power supply apparatuses are used as power supply apparatuses of projectors, for example. The switching power supply apparatuses according to the preferred embodiments described below preferably perform lighting control of one main load and three sub-loads, as diode loads, for example.

First Preferred Embodiment

Figure 1:
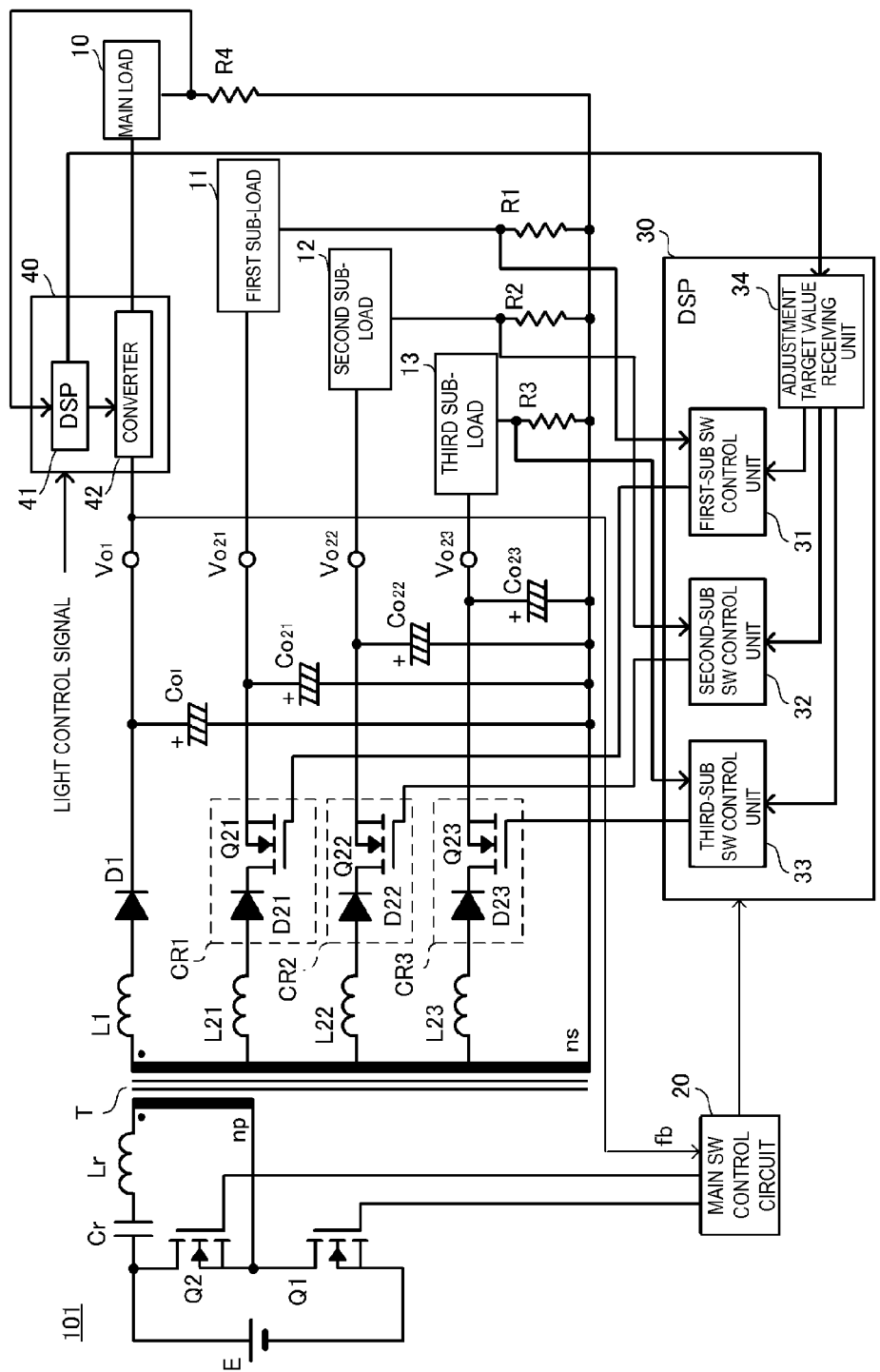
FIG. 1 is a circuit diagram of a switching power supply apparatus according to a first preferred embodiment of the present invention.

FIG. 1 is a circuit diagram of a switching power supply apparatus according to a first preferred embodiment of the present invention. A switching power supply apparatus 101 according to the present preferred embodiment includes a transformer T including a primary winding np and a secondary winding ns. The switching power supply apparatus 101 includes an input power supply E on the primary side of the transformer T, and a main load 10, a first sub-load 11, a second sub-load 12, and a third sub-load 13 on the secondary side of the transformer T.

A low-side switch device Q1 is serially connected to the primary winding np. In addition, a capacitor Cr and an inductor Lr for resonance and a high-side switch device Q2 are connected to the primary winding np so as to define a closed loop. A switch circuit including the low-side switch device Q1, the high-side switch device Q2, and the like causes a current to flow through the primary winding np in the positive/negative directions as a result of the low-side switch device Q1 and the high-side switch device Q2 being complementarily switched on/off with a dead time between the on periods. This causes an induced voltage to be generated in the secondary winding ns of the transformer T.

A main rectifying and smoothing circuit is connected to one end (main output unit) of the secondary winding. The main rectifying and smoothing circuit includes an inductor L1, a first rectifying device D1, and a smoothing capacitor $Co_1$ connected to one another. The main rectifying and smoothing circuit rectifies and smoothes the induced voltage received from the secondary winding ns and generates a main output voltage $Vo_1$. Note that the main output voltage $Vo_1$ generated by the main rectifying and smoothing circuit is determined by the switching control of the low-side switch device Q1 and the high-side switch device Q2.

A DC-DC converter 40 is connected to the main rectifying and smoothing circuit. The DC-DC converter 40, for example, steps down the main output voltage $Vo_1$, which is about 12 V, output from the main rectifying and smoothing circuit, and performs intermittent driving (burst driving) of the main load 10 in a stage subsequent to the DC-DC converter 40 at, for example, about 100 Hz to about 200 Hz.

The DC-DC converter 40 includes a digital signal processor (DSP) 41 and a converter 42. A light control signal of the main load 10 is input from the outside to the DSP 41. A resistor R4 for current detection is connected to the main load 10, and the DSP 41 detects a current flowing through the main load 10 (hereinafter, called a main load current) as needed. The DSP 41 controls the burst time of the intermittent output of the converter 42 such that the main load 10 maintains a target current determined by the light control signal.

The DSP 41, by detecting power supplied to the main load 10 in the subsequent stage, determines the load status of the main load 10. For example, when the power supplied to the main load 10 is high, the main load 10 is determined to be in a heavy load state, and when the power supplied to the main load 10 is low, the main load 10 is determined to be in a light load state. The DSP 41 outputs the determined result of the load status as load information to a DSP (second control unit) 30 provided on the secondary side of the transformer T.

Further, respective light control signals corresponding to the first sub-load 11, the second sub-load 12, and the third sub-load 13 are input to the DSP 41. The DSP 41 outputs the received light control signals to the DSP 30. Note that the functions realized using the DSPs may be realized using micro control units (MCUs), for example.

The secondary winding ns includes a plurality of taps. First, second, and third sub-rectifying and smoothing circuits are connected to the respective taps. These plurality of taps correspond to sub-output units.

The first sub-rectifying and smoothing circuit includes an inductor L21 connected to the tap of the secondary winding ns, a first rectifying circuit CR1, and a smoothing capacitor $Co_{21}$. The first rectifying circuit CR1 includes a diode D21 and a switch device Q21. The first sub-rectifying and smoothing circuit rectifies and smoothes an induced voltage received from the tap of the secondary winding ns and generates a sub-output voltage $Vo_{21}$. The sub-output voltage $Vo_{21}$ is applied to the first sub-load 11 which is located in a subsequent stage and is connected to the first sub-rectifying and smoothing circuit.

The second sub-rectifying and smoothing circuit includes an inductor L22 connected to the tap of the secondary winding ns, a second rectifying circuit CR2, and a smoothing capacitor $Co_{22}$. The second rectifying circuit CR2 includes a diode D22 and a switch device Q22. The second sub-rectifying and smoothing circuit rectifies and smoothes an induced voltage received from the tap of the secondary winding ns and generates a sub-output voltage $Vo_{22}$. The sub-output voltage $Vo_{22}$ is applied to the second sub-load 12 which is located in a subsequent stage and is connected to the second sub-rectifying and smoothing circuit.

The third sub-rectifying and smoothing circuit includes an inductor L23 connected to the tap of the secondary winding ns, a third rectifying circuit CR3, and a smoothing capacitor $Co_{23}$. The third rectifying circuit CR3 includes a diode D23 and a switch device Q23. The third sub-rectifying and smoothing circuit rectifies and smoothes an induced voltage received from the tap of the secondary winding ns and generates a sub-output voltage $Vo_{23}$. The sub-output voltage $Vo_{23}$ is applied to the third sub-load 13 which is located in a subsequent stage and is connected to the third sub-rectifying and smoothing circuit.

The inductors L1, L21, L22, and L23 delay the rising of currents flowing into the subsequent stages from the secondary winding ns across which the induced voltages are generated. These inductors L1, L21, L22, and L23 may be realized by leakage inductances of the transformer T or may be external real components. When the delaying of the rising of the currents is not needed, the inductors may be omitted.

The switching power supply apparatus 101 includes, on the primary side of the transformer T, a main switching control circuit (hereinafter, called a main SW control circuit) 20 that performs switching control of the low-side switch device Q1 and the high-side switch device Q2. The main SW control circuit 20 (first control unit) receives a feedback signal fb corresponding to the main output voltage $Vo_1$. The feedback signal fb is fed back from the secondary side to the primary side through an insulating member, such as a photo coupler (not illustrated), for example.

Since the main output voltage $Vo_1$ varies in accordance with a change in the load status (amount of change in current) of the main load 10, the low-side switch device Q1 and the high-side switch device Q2 are controlled by the main SW control circuit 20 based on the feedback signal fb so as to be alternately switched on and off with a short dead time between the on periods to stabilize the main output voltage $Vo_1$. The main SW control circuit 20 outputs the switching synchronization signal of the low-side switch device Q1 and the high-side switch device Q2 to the DSP 30.

The DSP 30 includes a plurality of functional units, such as a first sub-SW control unit 31, a second sub-SW control unit 32, a third sub-SW control unit 33, and an adjustment target value receiving unit 34. The first sub-SW control unit 31, the second sub-SW control unit 32, and the third sub-SW control unit operate similarly to one another. Hence, hereinafter, the first sub-SW control unit 31 will be described and the reference numerals of the corresponding second sub-SW control unit 32 and the third sub-SW control unit 33 will be shown in parentheses.

The adjustment target value receiving unit 34 receives a target value signal for the first sub-load 11 (12, 13) output by the DSP 41. The adjustment target value receiving unit 34 outputs a target current value determined by the received target value signal to the first sub-SW control unit 31 (32, 33).

The first sub-SW control unit 31 (32, 33) detects a current flowing through the first sub-load 11 (12, 13) (hereinafter, called a sub-load current). A current detection resistor R1 (R2, R3) connected to the first sub-load 11 (12, 13) is used to detect the sub-load current. The first sub-SW control unit 31 (32, 33) performs switching control of the switch device Q21 (Q22, Q23) such that the sub-load current is maintained below or equal to the target current value set by the adjustment target value receiving unit 34.

The adjustment target value receiving unit 34 obtains the load information output from the DSP 41 of the DC-DC converter 40. The adjustment target value receiving unit 34 changes the target current value set in the first sub-SW control unit 31 (32, 33) based on the load information. When the target current value has been changed, the first sub-SW control unit 31 (32, 33) performs switching control of the switch device Q21 (Q22, Q23) to maintain the current below or equal to the target current value subsequent to the change. As a result, generation of a surge is prevented in currents output from the first, second, and the third sub-rectifying and smoothing circuits. In particular, an overvoltage and an overcurrent are prevented from being added to the first sub-load 11 (12, 13) by preventing a surge causing an increase in current.

Hereinafter, how generation of a surge can be prevented will be described in detail while describing the operation of the whole switching power supply apparatus 101.

Figure 2:
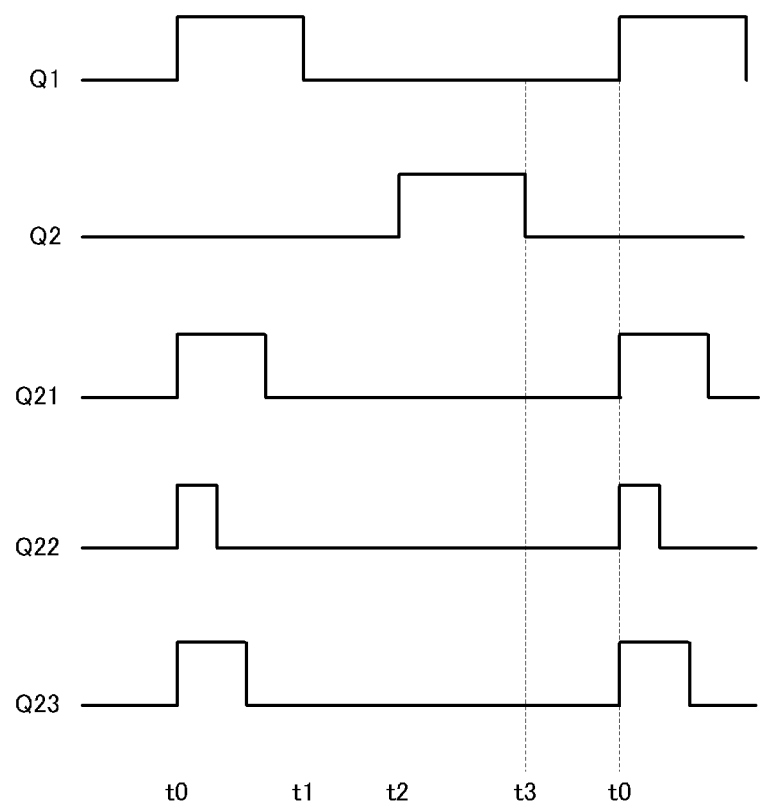
FIG. 2 is a timing chart illustrating the operations of the switch devices of the switching power supply apparatus.

FIG. 2 is a timing chart illustrating the operations of the switch devices of the switching power supply apparatus 101.

t0-t1

When the low-side switch device Q1 is on and the high-side switch device Q2 is off, a current flows through a path from the input power supply E, via the primary winding np of the transformer T, to the low-side switch device Q1. As a result, an induced voltage is generated in the secondary winding ns of the transformer T. The induced voltage generated at this time is rectified and smoothed by the main rectifying and smoothing circuit, and a DC current is supplied to the main load 10 through the DC-DC converter 40. As a result, the main load 10 is lit.

The switch devices Q21, Q22, and Q23 are respectively switched on for predetermined periods in synchronization with the switching on of the low-side switch device Q1. The on periods of the switch devices Q21, Q22, and Q23 are set in accordance with the light control of the first sub-load 11, the second sub-load 12, and the third sub-load 13. The first sub-load 11, the second sub-load 12, and the third sub-load 13 are lit as a result of the switch device Q21, the switch device Q22, and the switch device Q23 being switched on and rectification and smoothing being performed.

t1-t2

When the low-side switch device Q1 and the high-side switch device Q2 are off, a current flows through a path from the primary winding np of the transformer T, via the body diode of the high-side switch device Q2, to the capacitor Cr. At this time, the capacitor Cr is charged. No current flows on the secondary side of the transformer T.

t2-t3

When the low-side switch device Q1 is off and the high-side switch device Q2 is on, a current flows from the charged capacitor Cr through a path from the capacitor Cr, via the high-side switch device Q2, to the primary winding np. No current flows on the secondary side of the transformer T.

t3-t0

When the low-side switch device Q1 and the high-side switch device Q2 are off, a current flows through a path from the capacitor Cr, via the primary winding np, to the body diode of the low-side switch device Q1, whereby the capacitor Cr is discharged. No current flows on the secondary side of the transformer T.

As illustrated in FIG. 1, the first sub-load 11 (12, 13) is intermittently driven by a rectified and smoothed output. On the other hand, the main load 10 is intermittently driven at about 100 Hz to about 200 Hz. Hereinafter, a current waveform at the time when the main load 10 is driven while the first sub-load 11 (12, 13) is being driven will be described.

FIG. 3 is a diagram illustrating the current waveforms of the main load current and sub-load current. The upper portion of the figure illustrates the waveforms at the time when a surge is generated and the lower portion of the figure illustrates the current waveforms at the time when generation of a surge is suppressed. FIG. 3 illustrates a change in the target value set in the first sub-SW control unit 31 (32, 33).

When the main load 10 is turned on, a load supply current flows through the DC-DC converter 40 and, hence, the main output voltage $Vo_1$ decreases. Since the main SW control circuit 20 performs feedback control so as to stabilize the main output voltage $Vo_1$, the on periods of the low-side switch device Q1 and the high-side switch device Q2 become long. Hence, the output voltages of the taps of the secondary winding ns increase. Here, if the on periods of the switch devices Q21, Q22, and Q23 continue to be the same, since the on periods of the input rapidly increase, the sub-output voltages $Vo_{21}$, $Vo_{22}$, and $Vo_{23}$ increase. As is illustrated by the region A in FIG. 3, a current surge in the positive direction is generated in the sub-load current during the rising time of the main load current.

In the present preferred embodiment, when the main load 10 is turned on, i.e., when the main load current rises, the adjustment target value receiving unit 34 is made to change the target current value set in the first sub-SW control unit 31 (32, 33) to a target current value corresponding to the load status of the main load 10, for a predetermined period of time Tu1. As a result, even when a voltage input to the switch device Q21 (Q22, Q23) momentarily increases, the first sub-SW control unit 31 (32, 33) can perform switching control in accordance with this increase, such that generation of a surge is prevented.

When the main load 10 is turned off, a load supply current stops flowing through the DC-DC converter 40 and, hence, the main output voltage $Vo_1$ increases. Since the main SW control circuit 20 performs feedback control so as to stabilize the main output voltage $Vo_1$, the on periods of the low-side switch device Q1 and the high-side switch device Q2 become short. Hence, the output voltages of the taps of the secondary winding ns decrease. Here, if the on periods of the switch devices Q21, Q22, and Q23 continue to be the same, since the on periods of the inputs rapidly decrease, the sub-output voltages $Vo_{21}$, $Vo_{22}$, and $Vo_{23}$ decrease. As illustrated by the region B in FIG. 3, a current surge in the negative direction (rapid decrease) is generated in the sub-load current during the falling time of the main load current.

In the present preferred embodiment, when the main load is turned off, i.e., when the main load current falls, the adjustment target value receiving unit 34 is made to change the target current value set in the first sub-SW control unit 31 (32, 33) to a target current value corresponding to the load status of the main load 10, for a predetermined period of time Tu2. As a result, even when a voltage input to the switch device Q21 (Q22, Q23) momentarily decreases, the first sub-SW control unit 31 (32, 33) can perform switching control in accordance with this decrease, such that generation of a surge is prevented.

Note that the periods of time Tu1 and Tu2 are less than or equal to periods of time from the generation to termination of surges generated in the regions A and B, and are predetermined periods of time based on, for example, experiments.

Second Preferred Embodiment

Figure 4:
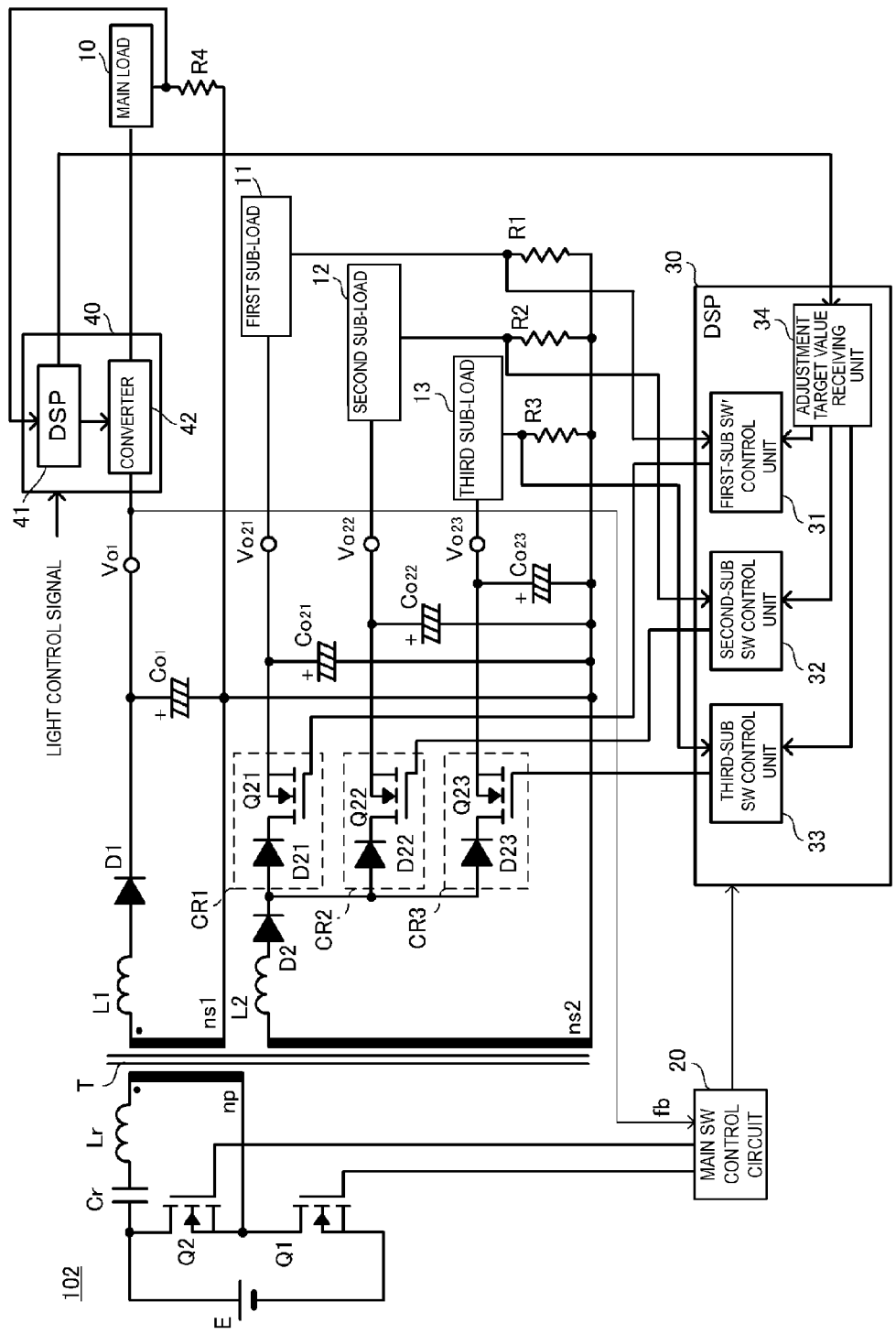
FIG. 4 is a circuit diagram of a switching power supply apparatus according to a second preferred embodiment of the present invention.

FIG. 4 is a circuit diagram of a switching power supply apparatus according to a second preferred embodiment of the present invention. A switching power supply apparatus 102 according to the second preferred embodiment is different from the switching power supply apparatus 101 according to the first preferred embodiment in terms of the configuration on the secondary side of the transformer T. Hereinafter, the circuit configuration on the secondary side of the transformer T will be described. Note that components that are similar to those of the first preferred embodiment are denoted by the same reference symbols and duplicate descriptions thereof are omitted.

A transformer T includes two secondary windings ns1 and ns2. A main rectifying and smoothing circuit is connected to the secondary winding (main output unit) ns1. The main rectifying and smoothing circuit includes an inductor L1, a first rectifying device D1, and a smoothing capacitor $Co_1$, and applies a main output voltage $Vo_1$ to a main load 10 in a subsequent stage through a DC-DC converter 40.

An inductor L2 and a diode D2 are connected to the secondary winding (sub-output unit) ns2. First, second, and third sub-rectifying and smoothing circuits are connected to the cathode of the diode D2. The first, second, and third sub-rectifying and smoothing circuits have configurations similar to those in the first preferred embodiment.

In the present preferred embodiment, induced voltages of the independent secondary windings ns1 and ns2 are respectively applied to the main load 10 and to the first sub-load 11, the second sub-load 12, and the third sub-load 13.

The switching power supply apparatus 102 includes a main SW control circuit 20 that performs switching control of a low-side switch device Q1 and a high-side switch device Q2. The switching power supply apparatus 102 includes a DSP 30 including a plurality of functional units, such as a first sub-SW control unit 31, a second sub-SW control unit 32, a third sub-SW control unit 33, and an adjustment target value receiving unit 34.

Components such as the main SW control circuit 20, the DSP 30, and the DC-DC converter 40 operate similarly to those of the first preferred embodiment and prevent an overshoot and an undershoot respectively generated in sub-load currents when a main load current rises and falls.

In the various preferred embodiments described above, the adjustment target value receiving unit 34 of the DSP 30 receives the target value signal that determines a target current corresponding to the load status and that is output by the DSP 41. However, a configuration may be used in which by inputting the light control signal directly to the DSP 30, the DSP 30 performs setting and receives only the amount of compensation corresponding to the load status from the DSP 41. Further, the DSP 41 and the DSP 30 may be combined into a single DSP. In addition, although a configuration is preferably used in which a DC-DC converter is provided in a stage prior to the main load, the present invention can be applied to a configuration in which the DC-DC converter is not provided.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A switching power supply apparatus comprising:
   a transformer including an input unit, a main output unit, and a sub-output unit;
   a switch circuit that switches between application of and stopping application of a voltage to the input unit;
   a main rectifying and smoothing circuit that rectifies and smoothes an induced voltage received from the main output unit and outputs a main output voltage;
   a converter unit that steps up or steps down the main output voltage and outputs stepped up or stepped down voltage to a main load in a subsequent stage;
   a sub-rectifying and smoothing circuit that is provided in the sub-output unit and, through switching of a switch device, rectifies and smoothes an induced voltage received from the sub-output unit and outputs the rectified and smoothed voltage to a sub-load connected to the sub-rectifying and smoothing circuit;
   a first control unit that performs switching control of the switch circuit based on a feedback signal corresponding to the main output voltage;
   a second control unit that, based on a set target value, performs switching control of the switch device of the sub-rectifying and smoothing circuit and drives the sub-load;
   a detection unit that detects information regarding a load status of the main load; and
   a changing unit that changes the target value based on the information detected by the detection unit.

2. The switching power supply apparatus according to claim 1, wherein the converter unit performs intermittent driving of the main load, and the changing unit changes the target value at a time when a current of the intermittent driving rises.

3. The switching power supply apparatus according to claim 2, wherein the changing unit changes the target value at a time when the current of the intermittent driving falls.

4. The switching power supply apparatus according to claim 1, wherein the changing unit increases an amount of change of the target value in accordance with an increase in an amount of change of a current of the main load.

5. The switching power supply apparatus according to claim 1, wherein the switch circuit includes a low-side switch connected to a primary winding of the transformer and a high-switch switch connected to the primary winding of the transformer.

6. The switching power supply apparatus according to claim 5, further comprising a capacitor and an inductor connected to the primary winding and arranged to define a closed loop with the high-side switch.

7. The switching power supply apparatus according to claim 1, wherein the main rectifying and smoothing circuit is connected to the main output unit.

8. The switching power supply apparatus according to claim 1, wherein the main rectifying and smoothing circuit includes an inductor, a first rectifying device, and a smoothing capacitor connected to one another.

9. The switching power supply apparatus according to claim 1, wherein the converter unit includes a DC-DC converter.

10. The switching power supply apparatus according to claim 1, wherein the converter unit includes a digital signal processor and a converter.

11. The switching power supply apparatus according to claim 10, wherein the digital signal processor detects a current flowing through the mail load and controls a burst time of intermittent output of the converter such that the main load maintains a target current.

12. The switching power supply apparatus according to claim 1, wherein the second control unit includes a digital signal processor arranged to receive load information from the converter unit.

13. The switching power supply apparatus according to claim 1, wherein the sub-load is a first sub-load, the switching power supply apparatus further comprising a second sub-load and a third sub-load arranged on a secondary side of the transformer, wherein light control signals corresponding to the first sub-load, the second sub-load and the third sub-load are input to the converter unit.

14. The switching power supply apparatus according to claim 1, wherein the transformer includes a secondary winding including a plurality of taps, and first, second and third sub-rectifying and smoothing circuits are connected to the taps, respectively.

15. The switching power supply apparatus according to claim 14, wherein each of the first, second and third sub-rectifying and smoothing circuits includes an inductor, a rectifying circuit and a smoothing capacitor.

16. The switching power supply apparatus according to claim 1, wherein the second control unit includes a plurality of sub-switching control units and an adjustment target value receiving unit.

17. The switching power supply apparatus according to claim 16, wherein at least one of the sub-switching control units performs switching control if a voltage input to a switching device increases to prevent a surge.

18. The switching power supply apparatus according to claim 1, wherein the transformer includes two secondary windings.

19. The switching power supply apparatus according to claim 1, wherein the main rectifying and smoothing circuit includes an inductor, a rectifying device, and a smoothing capacitor arranged to apply the main output voltage to the main load in the subsequent stage through a DC-DC converter.

20. A projector comprising the power supply apparatus according to claim 1.

* * * * *